United States Patent [19]
Gunji

[11] Patent Number: 5,392,438
[45] Date of Patent: Feb. 21, 1995

[54] COMPUTER SYSTEM WITH CONTROL UNIT FOR CONTROLLING POWER SUPPLY TO STORAGE UNIT

[75] Inventor: Shizuka Gunji, Tokyo, Japan

[73] Assignee: Kabushiki Kaisha Toshiba, Kawasaki, Japan

[21] Appl. No.: 33,970

[22] Filed: Mar. 19, 1993

Related U.S. Application Data

[63] Continuation of Ser. No. 578,275, Sep. 6, 1990, abandoned.

[30] Foreign Application Priority Data

Sep. 29, 1989 [JP] Japan .................. 1-254962

[51] Int. Cl.⁶ ............................................. G06F 12/16
[52] U.S. Cl. ................................. 395/750; 395/575; 365/227; 365/228; 365/229
[58] Field of Search ............... 395/750, 575; 364/200, 364/707, 431.1, 431.11, 900; 365/226, 227, 229, 228; 380/50; 377/61

[56] References Cited

U.S. PATENT DOCUMENTS

| | | | |
|---|---|---|---|
| 4,051,326 | 9/1977 | Badagnani et al. | 395/750 |
| 4,171,539 | 10/1979 | Tawfik et al. | 395/750 |
| 4,371,947 | 2/1983 | Fujisawa | 395/750 |
| 4,531,826 | 7/1985 | Stoughton et al. | 377/61 |
| 4,532,593 | 7/1985 | Mouri et al. | 364/431.11 |
| 4,551,841 | 11/1985 | Fujita et al. | 395/750 |
| 4,580,222 | 4/1986 | Fujii | 364/431.11 |
| 4,669,059 | 5/1987 | Little et al. | 395/750 |
| 4,712,196 | 12/1987 | Uesugi | 365/229 |
| 4,716,521 | 12/1987 | Nagae | 395/750 |
| 4,718,007 | 1/1988 | Yukino | 395/750 |
| 4,791,569 | 12/1988 | Suzuki | 364/431.11 |
| 4,809,163 | 2/1989 | Hirosawa et al. | 395/750 |
| 4,864,998 | 9/1989 | Onishi | 364/431.11 |
| 4,907,150 | 3/1990 | Arroyo et al. | 395/575 |
| 4,918,649 | 4/1990 | Nishimura | 395/750 |
| 4,965,828 | 10/1990 | Ergott, Jr. et al. | 380/50 |
| 4,980,836 | 12/1990 | Carter et al. | 364/200 |
| 5,041,964 | 8/1991 | Cole et al. | 395/425 |
| 5,095,438 | 3/1992 | Sasaki | 364/431.11 |
| 5,218,607 | 6/1993 | Saito et al. | 364/DIG. 2 |
| 5,239,495 | 8/1993 | Nanno et al. | 364/707 |
| 5,249,298 | 9/1993 | Bolan et al. | 395/750 |

FOREIGN PATENT DOCUMENTS 87300121.8  8/1987  European Pat. Off. .

OTHER PUBLICATIONS

Jonah McLeod, "This Laptop Has The Power Of An 80386-Based PC", Electronics, vol. 61, No. 9, Apr. 28, 1988, New York, pp. 103-104.

Toshiba T1600 Portable Personal Computer User's Manual, Sep. 1988.

Primary Examiner—David D. Knepper
Assistant Examiner—George Davis
Attorney, Agent, or Firm—Finnegan, Henderson, Farabow, Garrett & Dunner

[57] ABSTRACT

A computer system is provided with both an auto power off mode and a resume mode. In the computer system, the motor off command for an HDD is kept effective from the time when the system is turned on to the time when the HDD is accessed. During the interval, therefore, no power is supplied to the HDD. When the HDD has just been accessed, the motor off command is made ineffective, to thereby supply power to the HDD. When the power supply to the HDD is started, with the system in the resume mode, the CPU permits data processing to be performed from the state immediately before the power supply is stopped.

11 Claims, 5 Drawing Sheets

```
Power Save Option Selections

Resume Mode:            Boot
CPU Sleep Mode:         Enable
HDD Auto off:           Disable
Display Auto Off:       03Min.
Battery Alarm:          On
Built-in Modem Power:   On
```

(SET UP)

F I G. 6

```
Built-in Modem Power: On  Off
Sleep: Enabled  Disabled

HDD Auto Power Off:      Disabled
Display Auto Power Off: 03Min
```

(POP UP)

COMPUTER SYSTEM WITH CONTROL UNIT FOR CONTROLLING POWER SUPPLY TO STORAGE UNIT

This application is a continuation, of application Ser. No. 07/578,275, filed Sep. 6, 1990, now abandoned.

BACKGROUND OF THE INVENTION

1. Field of the Invention

The present invention relates generally to a computer system including a battery-driven personal computer, and more particularly to a control means, incorporated in the computer system, for controlling the power supply to a storage unit, so as to save the power provided by the battery.

2. Description of the Related Art

In recent years, lap top type personal computers integrally comprising a keyboard and a display unit have come into wide use. Some of the personal computers of this type are provided with not only a floppy disk drive (FDD) but also a hard disk drive (HDD) as standard equipment. Further, some of the personal computers of that type can be driven not only on a commercially-available AC power source but also on a chargeable battery.

In a personal computer which operates on a battery, the saving of power is one of the important factors in determining the performance of the personal computer. To provide an auto power off mode for the computer is one way for saving power as much as possible. The auto power off mode is a mode wherein the power supply to a given unit (e.g. a display unit) is automatically stopped if the keyboard is not operated for a predetermined length of time. The auto power off mode is described in U.S. patent application Ser. No. 378,755, filed Jul. 12, 1989, for example.

Some of the personal computers of the type mentioned above are provided with a resume mode, in which the data is transferred from registers even after into a backup memory, thereby securing the data when the power switch is turned off. Where a computer is set in this resume mode, the operating system (OS) need not be loaded when the computer is turned on, and a program can be restarted in the same state as it was held immediately before the computer was turned off. Let it be assumed that the power provided by the battery decreases and the battery is replaced with another or is charged. In this case, the computer, if set in the resume mode, need not be initialized when it is switched on, and data processing can be resumed. The resume mode is described in U.S. patent applications Ser. Nos. 343,356, 507,490, and 540,643, for example.

By utilization of both the auto power off mode and the resume mode, the battery-driven personal computer operates in a reliable manner without deteriorating in performance. However, if the battery-driven personal computer is provided with a storage unit which consumes a large amount of power, such as an HDD, the load on the battery increases. In spite of this load increase, it is impossible, as a matter of fact, to increase the capacity of the battery incorporated in a lap top type personal computer. Therefore, the time for which the battery can be used is limited where the computer incorporates a storage unit that consumes a large amount of power. As a result, the performance of the computer is degraded.

SUMMARY OF THE INVENTION

Accordingly, an object of the present invention is to provide a computer system which has both an auto power off mode and a resume mode and in which the power to be supplied to a storage unit, such as an HDD, is saved as much as possible. With the power supply to the storage unit being saved as much as possible, the computer system of the present invention can be driven on the battery for a long time, thus improving the performance of the computer system.

To achieve this object, the present invention provides a computer system which is provided with a storage unit and which comprises: a mode-setting unit for setting an auto power off mode wherein the power supply to a given unit of the system is cut off in response to a predetermined condition, and a resume mode wherein those contents in registers which are required for the system to execute data processing are stored in a backup memory when the system is turned off; a mode-executing unit for executing the auto power off mode and the resume mode set by the mode-setting unit; a command setting/resetting unit for setting a command in a control register to stop operation of the storage unit in response to actuation of the system and for resetting the command in the control register in response to access to the storage unit, in the case where the auto power off mode and the resume mode are both set by the mode-setting unit; and a storage control unit for cutting off the power supply to the storage unit in the case where the command is set in the control register and for actuating the storage unit in the case where the access to the storage unit is started and the command in the control register reset.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will now be described, with reference to the accompanying drawings.

Figure 1:
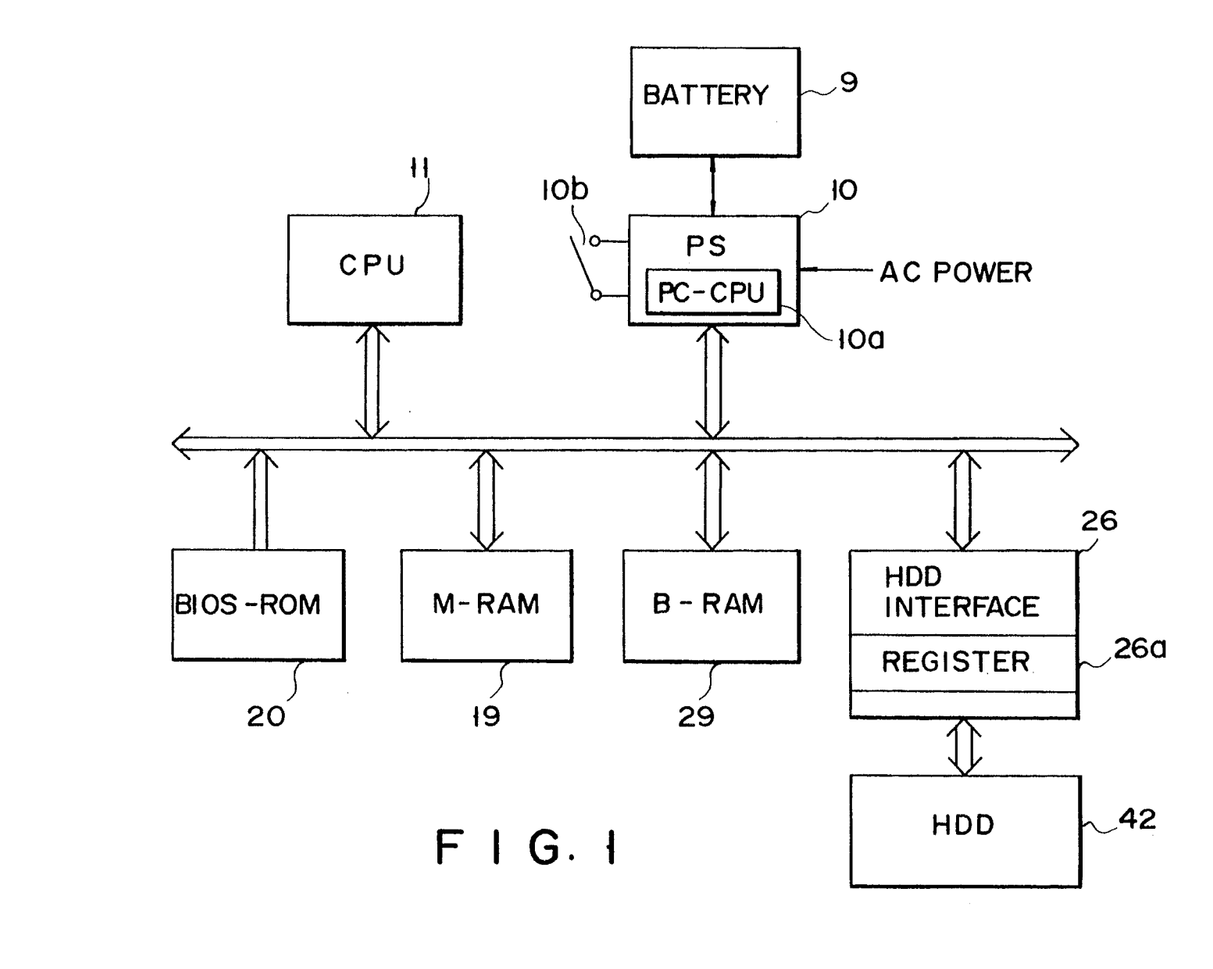
FIG. 1 is a block circuit diagram illustrating the main portion of a computer system according to an embodiment of the present invention.

The computer system of the embodiment includes a lap top type personal computer which can selectively use one of a battery and a commercially-available AC power source. As is shown in FIG. 1, the computer system comprises a power source (PS) circuit 10 which controls the power source under a power control processor (PC-CPU) 10a. The power source circuit 10 can be selectively switched to either a chargeable battery 9 or an AC power source (the power from which is supplied through an adapter), and supplies the selected driving power to the system. The power control processor 10a monitors the power state of the battery 9 or the AC power source, and informs a central processing unit (CPU) 11 of the monitored power state. The PC-CPU 10a outputs an interrupt signal when the power source switch 10b of the system is turned on or off, and supplies the interrupt signal to the CPU 11.

The CPU 11 controls the entire system and executes data processing of various kinds. When the system is actuated and initialized, the CPU 11 accesses a BIOS-ROM 20 and executes a program generally referred to as a BIOS (i.e., a basic input/output system). The BIOS-ROM 20 is a read-only memory in which the BIOS is stored beforehand. On the basis of the programs and data stored in a main memory (M-RAM) 19, the CPU 11 executes data processing of various kinds. The M-RAM 19 is a read/write memory (RAM) including a plurality of registers. A backup memory (B-RAM) 29 is a read/write memory (RAM) into which the contents in the registers (i.e., the M-RAM 19) are transferred when the CPU 11 executes resume processing.

The system of the present invention is provided with a hard disk drive (HDD) 42 (i.e., an external storage unit) as standard equipment. The driving of the HDD 42 is controlled by an HDD interface 26. This HDD interface 26 is connected between the CPU 11 and the HDD 42 and is under the control of the CPU 11. The HDD interface 26 includes a register 26a for setting a motor off command (MOC) supplied from the CPU 11. In response to the setting of the MOC, the HDD interface 26 stops the power supply to the HDD 42, so as to stop the motor rotating hard disk incorporated in the HDD 42.

The structural components shown in FIG. 1 have direct relevance to the essence of the present invention. In addition to those structural components, the system of the present invention comprises various controllers, peripheral units, and buses, as is shown in FIG. 8.

Figure 8:
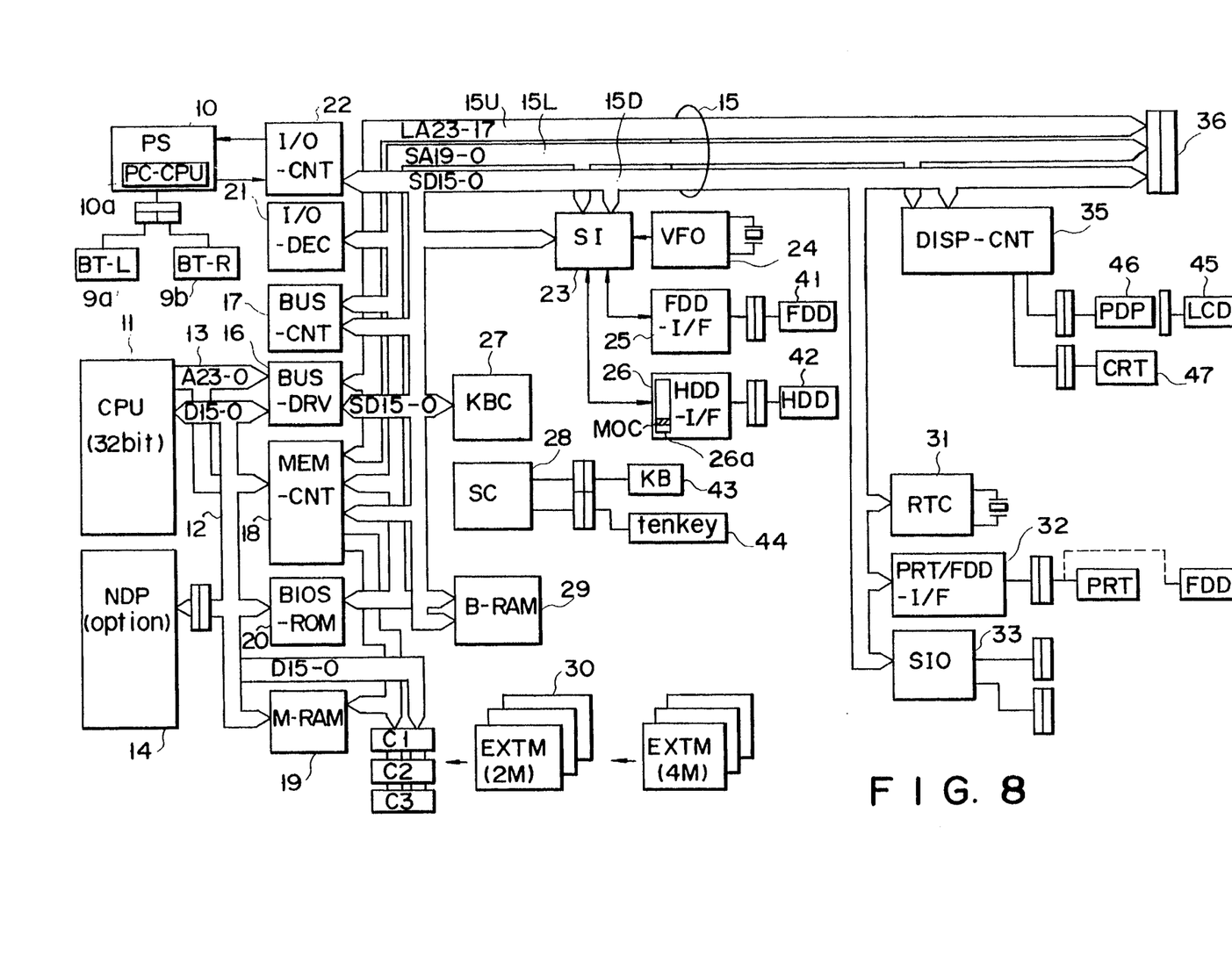
FIG. 8 is a block circuit diagram illustrating the entire computer system of the embodiment.

Referring to FIG. 8, the CPU 11 is connected to both a 16-bit data bus 12 and a 24-bit address bus 13. Through these buses 12 and 13, the CPU 11 accesses the BIOS-ROM 20 and the M-RAM 19 and is connected to a memory controller (MEM-CNT) 18. A bus driver (BUS-DRV) 16 serves as a connection interface between the data and address buses 12 and 13 (which are internal buses) and a system bus 15. This system bus 15 is controlled by a bus controller (BUS-CNT) 17. The MEM-CNT 18 controls the read/write operation performed with reference to the BIOS-ROM 20, the M-RAM 19, and the B-RAM 29.

An I/O decoder (I/O-DEC) 21 decodes an I/O address transferred through the system bus 15, and supplies the decoded I/O address to the corresponding I/O unit. An I/O controller (I/O-CNT) 22 controls I/O data to be input or output. A controller (SI) 23 controls not only the HDD interface 26 mentioned above but also an FDD interface (FDD-I/F) 25 which controls the driving of a floppy disk drive (FDD) 41. A variable frequency oscillator (VFO) 24 is a circuit which generates a clock used for the driving of the FDD 41.

The system of the embodiment is provided with both a keyboard (KB) 43 and a display unit as standard equipment. An operation of the keyboard 43 is converted into a key-in signal by a scan controller (SC) 28 and a keyboard controller (KBC) 27, and the key-in signal obtained by this conversion is supplied to the system bus 15. The keyboard 43 has not only character keys but also a ten-key pad 44. As the display unit of the system, a CRT display 47, a liquid crystal display (LCD) 45, or a plasma display (PDP) 46 is selected for use. The selected display unit is driven under the control of a display controller (DISP-CNT) 35.

The system of the embodiment comprises a timepiece module (RTC) 31, an input/output port 32, and a serial input/output interface (SIO) 33. The RTC 31 includes a memory (CMOS-RAM) which is backed up by an internal battery and which stores the setup data to be shown on the screen of the display unit. The input/output port 32 is an input/output interface which is used when a printer (PRT) or an FDD provided as an option is in use. The SIO 33 is an interface used when an external unit designed to meet with the RS-232 interface requirements is in use. In the system of the embodiment, extended memory cards (EXTM) 30, and card connectors C1–C3 used for the connection of the cards 30 can be used as an option.

A description will now be given of the operation of the above embodiment.

Figure 2:
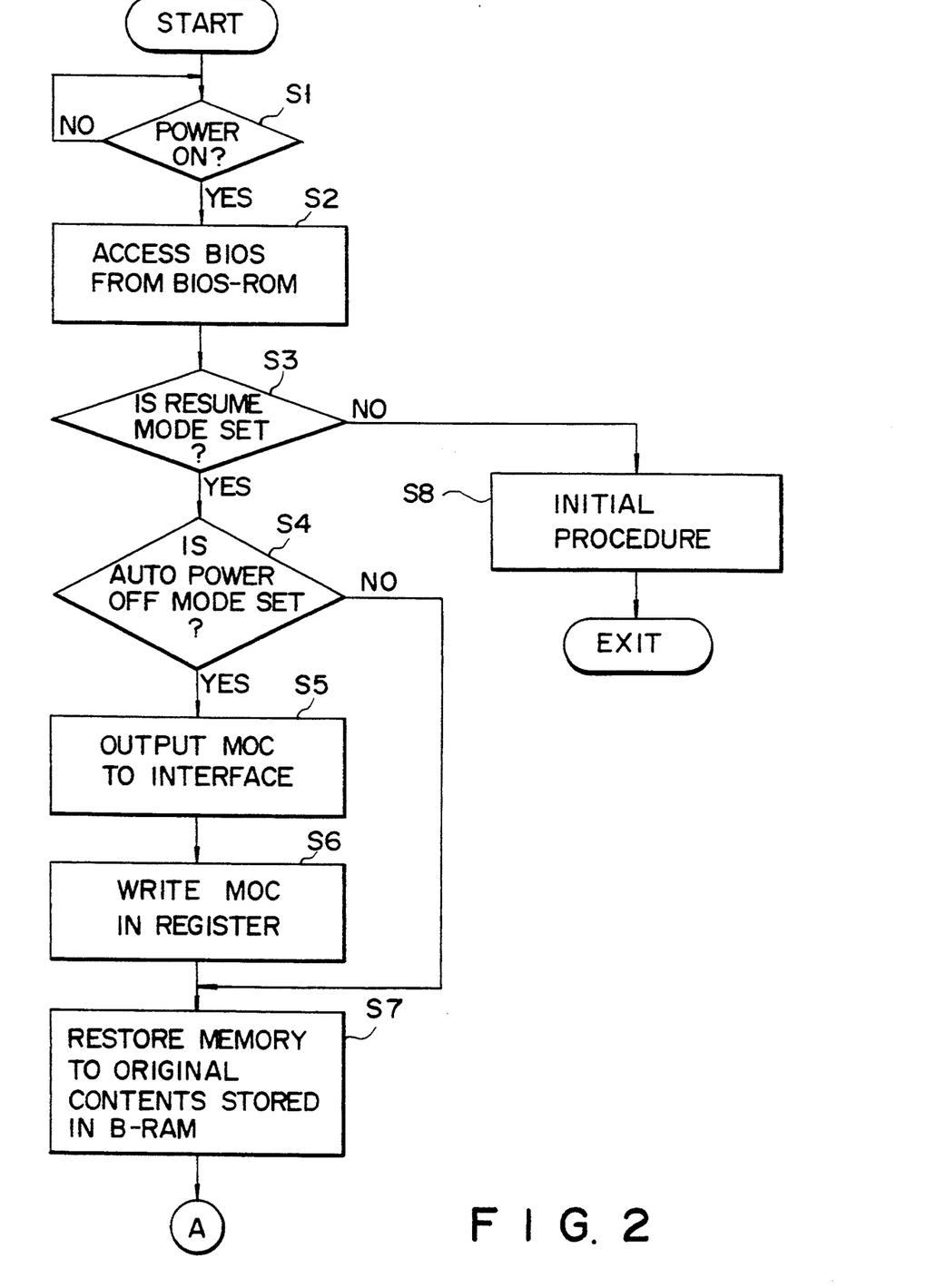
Figure 6:
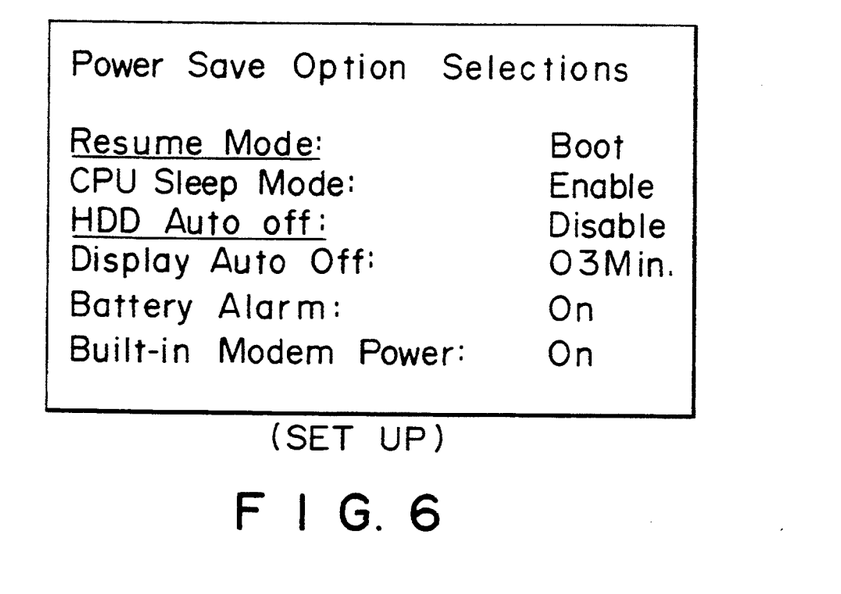
FIG. 6 shows a setup menu which is to be shown on the screen of the display unit employed in the embodiment.

Referring to FIG. 2, when the power source switch 10b of the system is turned on in step S1, the CPU 11 accesses the BIOS-ROM 20 in step S2, so as to read the BIOS from the BIOS-ROM 20. With the BIOS executed, the input/output control of the keyboard 43, the display unit, the HDD 42, etc. is executed. Then, the CPU 11 determines in step S3 whether the resume mode is set or not, by referring to the setup data stored in the memory of the RTC 31. In response to entry of a predetermined command from the keyboard 43, the CPU 11 activates the setup program, for the execution of the setup processing. As a result, the display unit displays the setup menu on its screen, as is shown in FIG. 6. It should be noted that the setup processing cannot be executed if an application program is being carried out. With the setup menu being displayed on the screen of the display unit, the user selects and designates the resume mode by means of the cursor. The mode designated on the setup menu on the screen is stored in the memory of the RTC 31 as part of the setup data.

If it is determined in step S3 that the resume mode is not set, the CPU 11 carries out ordinary initializing processing in step S8. More specifically, the CPU 11 loads the operating system and executes the bootstrap corresponding to the program to be activated. The operating system is stored in either the FDD or the HDD.

Next, in step S4, the CUP 11 determines whether the auto power off mode is set with respect to the HDD 42, by referring to the setup data. The auto power off mode is a mode wherein the power supply to the HDD 42 is automatically stopped unless the keyboard is operated within the predetermined time interval (which is within the range of 5 to 35 minutes in units of 5 minutes). If both the auto power off mode and the resume mode are set, the CPU 11 outputs a motor off command (MOC) and sets it in the register 26a of the HDD interface 26 (steps S5 and S6). In response to the motor off command (MOC), the HDD interface 26 stops the power supply to the HDD 42, thus stopping the disk-rotating motor of the HDD 42.

In the resume mode, the CPU 11 restores the registers of the M-RAM 19 in step S7 such that they store the same contents as they have immediately before the system is turned off. In other words, the contents in the registers of the M-RAM 19 are restored by reading data from the B-RAM 29. By so doing, the data processing which is performed in accordance with the access to the HDD 42 immediately before the system is switched off can be resumed when the HDD 42 is actuated next.

Figures 3, 4, 5:
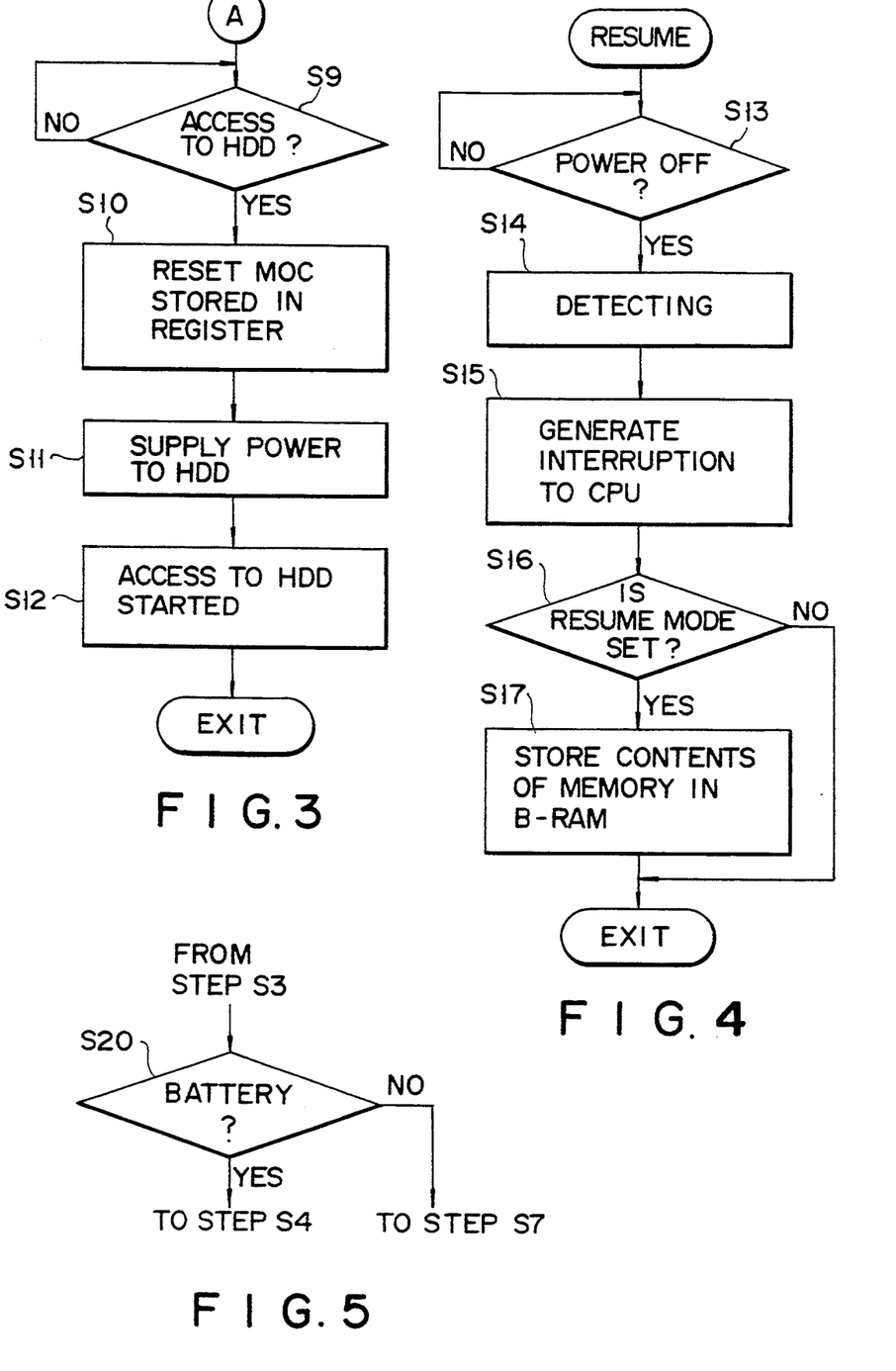
FIGS. 3, 4 and 5 are flowcharts for explaining the operation of the computer system of the embodiment.

When the resume mode is set, the processing shown in FIG. 4 is executed. Specifically, when the system is turned off, the PC-CPU 10a outputs an interrupt signal and supplies it to the CPU 11 (steps S13–S15). The PC-CPU 10a monitors the state of the power source circuit 10, detects on/off state of the power source switch 10b, and informs the CPU 11 of the detected on/off state. When the power source is turned off, the CPU 11 reads data out of the registers and stores it in the B-RAM 29 (steps S16 and 17). In this manner, all data that is held by the registers for data processing immediately before the system is turned off is saved in the B-RAM 29 and is therefore kept during the OFF state of the power source. When the power source is turned on next, the user can resume the data processing from the state immediately before the power source is turned off, by using the data stored in the B-RAM 29.

If the HDD 42 is accessed after the above-described preparations for the resume processing, the CPU 11 resets the MOC in the register 26a (steps S9 and S10). Since the MOC is reset, the HDD interface 26 begins to supply power to the HDD 42 (step S11). Accordingly, the disk-rotating motor of the HDD 42 is driven. After this, the CPU 11 accesses the driven HDD 42 (step S12), so as to read data or write data with reference to the HDD 42.

If it is determined in step S3 that the resume mode is set, step S20 may be executed, so as to determine whether or not the battery 9 is used as the power source of the system. If this step S20 is performed, the PC-CPU 10a determines which power source, the AC commercial power supply or the battery 9, is used for driving the system, and informs the CPU 11 of the result of the determination. If it is determined in step S20 that the battery 9 is used, the CPU 11 executes step S4 mentioned above. Accordingly, the power supply to the HDD 42 can be stopped for the saving of the power provided by the battery 9 only when the battery 9 is used as the power source of the system.

Figure 7:
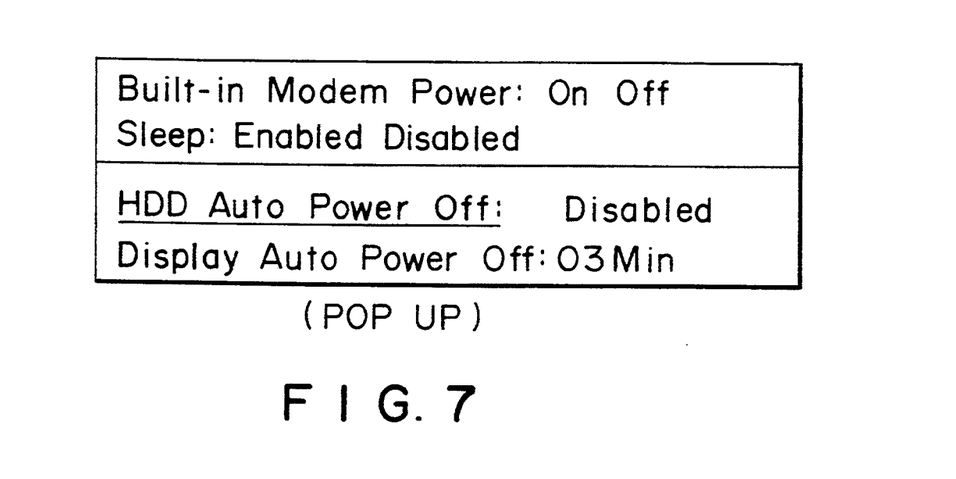
FIG. 7 shows a pop up menu which is to be shown on the screen of the display unit employed in the embodiment.

If the auto power off mode is not set, the MOC is not set in the register 26a, so that it is not possible to stop the power supply to the HDD 42. Therefore, the HDD 42 is driven simultaneously when the system is turned on. Since, however, the resume mode is set at the time, the processing of step S7 is carried out. Even if the auto power off mode is not set at the time of initialization, it can be set by use of the pop up menu shown in FIG. 7. The processing using the pop up menu can be performed even when an application program is being executed. More specifically, the user causes the pop up menu to be shown on part of the screen by operating a function key of the keyboard during the execution of the application program.

As mentioned above, when the auto power off mode and the resume mode are both set, the power supply to the HDD 42 is not started immediately after the power source switch of the system is turned on, and the HDD 42 is kept in a stationary state until it is actually accessed. Accordingly, the power consumption by the HDD 42 is reduced. In the case where the system is driven on the battery 9, the power-saving effect is very remarkable since the HDD consumes a comparatively large amount of power. In a battery-driven type-computer system to which the present invention is applied, the power provided by the battery 9 can be saved, so that the battery 9 can be used for a longer time than that of the conventional system. As a result, the performance of the battery-driven type computer can be improved.

Where the computer system is in the resume mode, the data processing performed last can be resumed immediately after the power supply to the HDD 42 is started. In other words, the data processing performed immediately before the system is turned off can be resumed, with the HDD 42 being accessed by the CPU 11 in the same manner. Thus, the data processing performed last time can be resumed with no need to actuate the system from the beginning.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system having registers, a backup memory, a power supply that supplies power to a plurality of units including an I/O unit and a storage unit, and a power switch means for controlling the power supply by turning on and off the power supplied by the power supply to the I/O unit, and the storage unit, said computer system comprising:

mode-setting means for setting an auto power off mode wherein the power switch means turns off the power supplied to the plurality of units if the I/O unit is kept unoperated for a predetermined length of time, and a data save/restore mode wherein contents in the registers which are required for data processing are stored in the backup memory when the power switch means turns off the power from the power supply and wherein the contents stored in the backup memory are restored in the registers when the power switch means turns on the power from the power supply;

mode-executing means for executing the auto power off mode and the data save/restore mode set by the mode-setting means;

command setting/resetting means for setting a command in a control register to stop an operation of the storage unit when the power switch means turns on the power from the power supply and for resetting the command in the control register in response to an access to the storage unit when the auto power off mode and the data save/restore mode are both set by the mode-setting means; and storage control means for signaling the power switch means to turn off the supply of power to the storage unit when the command is set in the control register, and for signaling the power switch means to supply power to the storage unit when the command is reset in the control register by the command setting/resetting means.

2. A computer system according to claim 1, wherein said storage unit includes a hard disk drive.

3. A computer system according to claim 1, wherein said mode-setting means sets the auto power off mode and the data save/restore mode in response to selection from among a plurality of mode items included in a setup menu displayed on a display unit.

4. A computer system according to claim 1, wherein said storage control means includes the control register and constitutes an interface circuit of the storage unit.

5. A computer system according to claim 1, further comprising:

power source control means for outputting an interrupt signal which designates whether the power switch means is turned on or off; and a CPU for executing the data processing and the resume mode in accordance with the interrupt signal output from the power source control means.

6. A computer system according to claim 1, further comprising:

means for restoring the registers by transferring data from the backup memory to the registers when the system is turned on, in the case where the data save/restore mode is on but the auto power off mode is off.

7. A computer system according to claim 1, wherein said mode-executing means causes those contents in the registers which are required for the system to execute data processing to be stored in the backup memory in response to the operation of turning off the system, in the case where the data save/restore mode is on.

8. A computer system according to claim 1, wherein said system is supplied with power from one of a battery and an AC power source and further comprises power source control means for selecting one of the battery and the AC power source for use with the system, said power source control means making the command setting/resetting means inoperative when the AC power source is used, and making the command setting/resetting means operative when the battery is used.

9. A computer system according to claim 2, wherein said storage control means includes an interface circuit used for a hard disk drive and incorporates the control register.

10. A method for a computer system having power switch means for controlling a supply of power from a power supply to an I/O unit and a storage unit, said method comprising the steps of:

setting an auto power off mode wherein the power supply to a given unit is discontinued by signaling the power switch means to turn off the supply of power if the I/O unit is kept unoperated for a predetermined length of time, and a data save/restore mode wherein contents in registers which are required for data processing are stored in a backup memory when the power switch means turns off the supply of power and wherein the contents in the registers are restored to the contents stored in the backup memory when the power switch means turns on the supply of power;

setting a command in a control register to stop an operation of the storage unit when the power switch means turns on the supply of power and for resetting the command in the control register in response to access to the storage unit when the auto power off mode and the data save/restore mode are both set; and turning off the supply of power from the power supply to the storage unit when the command is set in the control register and turning on the supply of power to the storage unit when the command is reset in the control register.

11. A computer system according to claim 10, wherein the registers are restored to the contents stored in the backup memory owing to the data save/restore mode when the power supply to the storage unit is stopped.

* * * * *

UNITED STATES PATENT AND TRADEMARK OFFICE
CERTIFICATE OF CORRECTION

PATENT NO. : 5,392,438  
DATED : February 21, 1995  
INVENTOR(S) : Shizuka GUNJI et al It is certified that error appears in the above-indentified patent and that said Letters Patent is hereby corrected as shown below:

Claim 5, Column 7, Line 13, "resume" should read --data save/restore--.

Signed and Sealed this

Seventh Day of November, 1995

*Attest:*

BRUCE LEHMAN

*Attesting Officer*    *Commissioner of Patents and Trademarks*